United States Patent
Hakobyan et al.

(10) Patent No.: US 11,971,472 B2
(45) Date of Patent: Apr. 30, 2024

(54) METHOD FOR DETERMINING AN EGO-VELOCITY ESTIMATED VALUE AND AN ANGLE ESTIMATED VALUE OF TARGETS

(71) Applicant: Robert Bosch GmbH, Stuttgart (DE)

(72) Inventors: Gor Hakobyan, Stuttgart (DE); Johannes Fink, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 362 days.

(21) Appl. No.: 17/456,708

(22) Filed: Nov. 29, 2021

(65) Prior Publication Data
US 2022/0179060 A1    Jun. 9, 2022

(30) Foreign Application Priority Data
Dec. 7, 2020 (DE) ...................... 10 2020 215 424.4

(51) Int. Cl.
  *G01S 13/72*    (2006.01)
  *G01S 13/90*    (2006.01)
  *G01S 13/931*   (2020.01)

(52) U.S. Cl.
  CPC .............. *G01S 13/72* (2013.01); *G01S 13/90* (2013.01); *G01S 13/931* (2013.01); *G01S 2013/93271* (2020.01)

(58) Field of Classification Search
  CPC ........ G01S 7/415; G01S 13/42; G01S 13/931; G01S 7/411; G01S 13/584; G01S 13/90;
  (Continued)

(56) References Cited

U.S. PATENT DOCUMENTS

| | | | |
|---|---|---|---|
| 4,723,124 A * | 2/1988 | Boles ................... | G01S 13/9023 342/25 C |
| 10,048,366 B1 * | 8/2018 | Hong ...................... | G01S 13/90 |

(Continued)

FOREIGN PATENT DOCUMENTS

EP    3611541 A1 *   2/2020   .............. G01P 21/02

OTHER PUBLICATIONS

C. Grimm, T. Breddermann, R. Farhoud, T. Fei, E. Warsitz and R. Haeb-Umbach, "Discrimination of stationary from moving targets with recurrent neural networks in automotive Radar," 2018 IEEE MTT-S International Conference on Microwaves for Intelligent Mobility (ICMIM), Munich, Germany, 2018, pp. 1-4 (Year: 2018).*

*Primary Examiner* — Olumide Ajibade Akonai
(74) *Attorney, Agent, or Firm* — NORTON ROSE FULBRIGHT US LLP; Gerard A. Messina

(57) ABSTRACT

A method for determining an ego-velocity estimated value and an angle estimated value of targets using a synthetic aperture radar sensor. A distance is measured between the synthetic aperture radar sensor and each respective target. A relative velocity of the respective target is measured using the Doppler effect. An angle estimation of an angle estimated value takes place, which characterizes the angle between the direction of the ego-velocity of the synthetic aperture radar and the respective target. An individual ego-velocity estimated value of the synthetic aperture radar sensor is ascertained using the relative velocity and the angle estimated value for each target. A classification and distribution of the individual ego-velocity estimated values relating to stationary targets takes place, whose individual ego-velocity estimated values are situated within a predefinable range relative to one another, and relating to moving targets, whose individual ego-velocity estimated values are situated outside the range.

11 Claims, 4 Drawing Sheets

(58) Field of Classification Search
CPC .. G01S 13/9029; G01S 13/72; G01S 13/9047;
G01S 2013/93271; G01S 7/414; G01S
13/60; G01S 13/89; G01S 13/9094; G01S
13/9011; G01S 13/588; G01S
2013/93274; G06V 20/58; H01Q 21/06
See application file for complete search history.

(56) References Cited

U.S. PATENT DOCUMENTS

| | | | |
|---|---|---|---|
| 10,832,418 B1* | 11/2020 | Karasev | G06V 20/58 |
| 2009/0231181 A1* | 9/2009 | Yannone | G01S 5/04 |
| | | | 342/146 |
| 2012/0001791 A1* | 1/2012 | Wintermantel | G01S 7/0233 |
| | | | 342/109 |
| 2019/0369222 A1* | 12/2019 | Oh | G05D 1/101 |
| 2021/0011150 A1* | 1/2021 | Bialer | G01S 13/862 |

* cited by examiner

METHOD FOR DETERMINING AN EGO-VELOCITY ESTIMATED VALUE AND AN ANGLE ESTIMATED VALUE OF TARGETS

CROSS REFERENCE

The present application claims the benefit under 35 U.S.C. § 119 of German Patent Application No. DE 102020215424.4 filed on Dec. 7, 2020, which is expressly incorporated herein by reference in its entirety.

FIELD

The present invention relates to a method for determining an ego-velocity estimated value and an angle estimated value of targets with the aid of a synthetic aperture radar sensor. The present invention further relates to a radar sensor, which is configured to carry out the method according to the present invention.

BACKGROUND INFORMATION

Radar systems for measuring distance, relative velocity and angles of objects are increasingly used in motor vehicles for safety and comfort functions. Nowadays, synthetic aperture radar (SAR), in particular, is used for this purpose. The principle of the synthetic aperture allows for particularly exact angle measurements during an ego-motion of the radar sensor. The synthetic aperture takes advantage of the fact that due to the ego-motion of the radar sensor, the transceiver antennas are located at different local positions at the point in time of each measurement. The measurements are then processed to form a synthetic antenna aperture. In the evaluation, this may be equated with a large antenna aperture along the travel trajectory. As a result, a large synthetic aperture is achieved, which would be impractical or impossible with a real antenna aperture due to the large number of required antenna elements. With the aid of SAR, resolutions in the angle measurement are possible with a single transmitting antenna and a single receiving antenna, which would be unattainable using a real antenna aperture.

In order to evaluate the measured radar signals as a synthetic aperture, the radar surroundings are usually assumed to be stationary. In addition, the ego-motion of the radar sensor, and thus the positions at which the individual measurements have taken place, should be known. The trajectory of the radar is incorporated into the SAR evaluation algorithm and represents the basis for the calculation of the SAR image. Depending on the evaluation algorithm, an ego-velocity estimated value instead of the more exact trajectory may be sufficient for the calculation of the SAR image. The trajectory in this case is typically assumed to be linear; more complex trajectories on the other hand are not mappable.

Present radar systems in the motor vehicle sector generally use a frequency-modulated continuous wave radar (FMCW) with rapidly rising ramps—a so-called fast chirp modulation, in which multiple linear frequency ramps having the same steep slope are consecutively passed through. The mixture of the instantaneous transmit signal with the received signal results in a low-frequency signal (referred to as beat frequency), whose frequency is proportional to the distance. The system is generally designed in such a way that the portion of the beat frequency caused by the Doppler frequency is insignificant. The distance information obtained is largely unambiguous. In addition, it is possible to determine a Doppler shift by observing the temporal development of the phase of the complex distance signal across the ramps and to ascertain therefrom the relative velocity. The ascertainment of the distance and the ascertainment of the relative velocity take place independently of one another. A two-dimensional Fourier transform is generally used for this purpose.

The conventional SAR evaluation is based on stationary targets. Moving targets, which do not meet this assumption, result in an erroneous, angle-shifted and blurred mapping in the SAR image. In the case of motor vehicles, however, moving targets are equally of interest (for example, in order to avoid a collision with the latter). In order to estimate the intrinsic trajectory or ego-velocity of the radar sensor, two approaches are available: on the one hand, an external sensor—for example an inertial measuring unit (IMU) or an odometry sensor—is used. On the other hand, very computationally intensive autofocus algorithms are used, which are not applicable for the real time processing.

SUMMARY

A method is provided for determining an ego-velocity estimated value and an angle estimated value of multiple targets in the surroundings with the aid of a synthetic aperture radar sensor. The radar sensor may, for example, be used in vehicles. A distinction is made below between stationary targets (also referred to as stationary obstacles) and moving targets (also referred to as moving obstacles). Stationary targets are objects in the surroundings that do not move themselves, i.e., for example, buildings, trees, infrastructure on and at roads, etc. Moving targets are objects in the surroundings that move, i.e., for example, vehicles, pedestrians, other road users, etc.

In accordance with an example embodiment of the present invention, the radar sensor moves and in the process emits a plurality of measuring signals. A relative velocity is ascertained for each target from the emitted and received signals. To ascertain the relative velocity, the Doppler effect in the measured signals is evaluated and a Doppler shift, in particular, is ascertained. In addition, a distance between the synthetic aperture radar sensor and the target is also ascertained from the emitted and received signals. This may take place, for example, via a Fourier processing. In order to identify the targets in the measurements, a detection at a constant false alarm rate (CFAR) is carried out.

A rough angle estimation is subsequently carried out. In this case, one angle estimated value each is estimated for each target, which characterizes the target angle between the direction of the ego-velocity of the synthetic aperture radar sensor—i.e., the direction in which the radar sensor moves ("forward direction")—and the respective target. The angle estimation may, for example, take place with the aid of digital beam forming. For this purpose, the radar sensor includes at least one additional receiving channel and/or at least one additional transmission channel. The angle estimated value preferably directly indicates the target angle. However, the target angle may also emerge indirectly from a transformation or from mathematical correlations from the angle estimated value. Since the angle estimated values are subsequently processed still further, the angle estimation may be significantly less accurate as compared to the conventional angle measurement.

In accordance with an example embodiment of the present invention, an individual ego-velocity estimated value for the synthetic aperture radar sensor is calculated by back projection separately for each target with the aid of the relative velocity and the angle estimated value. This means that for each target, the measured or estimated values are used in order to obtain therefrom in each case an individual ego-velocity estimated value for the synthetic aperture radar sensor. Accordingly, a multitude of individual ego-velocity estimated values are typically ascertained, which are consequently a function of the velocity of the target. For the stationary targets, the individual ego-velocity estimated values are close to one another, since the relative velocity between the target and the radar sensor is proportional to the ego-velocity of the radar sensor and to the target angle. For the moving targets, however, the individual ego-velocity estimated values are further apart, since the relative velocity, in addition to the ego-velocity of the radar sensor and the target angle, is also a function of the velocity of the target. Moreover, in a typical situation, there are significantly more stationary targets present in the surroundings than moving targets with the same relative velocity to the radar sensor and the moving targets normally have velocities differing from one another.

A classification and distribution of the individual ego-velocity estimated values, in particular, by clustering, is therefore possible. For this purpose, a range for the individual ego-velocity estimated values is defined, with which a distinction is possible between stationary targets and moving targets. Individual ego-velocity estimated values situated around one another within a predefinable range are assigned to stationary targets. Individual intrinsic estimated values situated outside the range are assigned to moving targets. Moving targets may thereby be identified (MTI— moving target indication). The respectively calculated individual ego-velocity estimated values may, for example, be incorporated in a histogram for the purpose of classification.

In accordance with an example embodiment of the present invention, the individual ego-velocity estimated values are then subsequently separately evaluated depending on the assignment. For the stationary targets, a combined ego-velocity estimated value is ascertained from the individual ego-velocity estimated values assigned to the stationary targets. The combined ego-velocity estimated value may be regarded as the actual ego-velocity of the radar sensor, since this value, in principle, has been calculated only from the stationary targets (autofocus). In addition, a corrected angle estimated value is calculated for the stationary targets with the aid of the combined ego-velocity estimated value and of the relative velocity measured in each case. The corrected angle estimated value may be regarded as the actual angle of the target with respect to the radar sensor.

The combined ego-velocity estimated value thus ascertained and the ascertained corrected angle estimated value are more exact compared to conventionally ascertained values, which have been ascertained with the aid of a synthetic aperture radar, since the moving targets are eliminated during the ascertainment.

The example method also enables the determination of the ego-velocity estimated value and the angle estimated value directly from the measurements, without the need for additional sensors such as, for example, IMU or odometry sensors. The odometry sensors typically used in vehicles are usually situated too far removed from the radar sensor and, in addition, carry out too few measurements per time interval.

The predefinable range used in the classification and distribution of the individual ego-velocity estimated values is advantageously an error tolerance range for the measurements. This range is ascertained from the error for the measurement of the relative velocity and from the error for the angle estimation. As a result, the distribution takes place specifically within the error limits for the measurements and thus provides the greatest possible selectivity.

The angle estimation for each target takes place preferably with the aid of multiple receiving and/or transmission channels at different positions. A sensor array, in particular, is provided for this purpose, which includes the multiple receiving and/or transmission channels. In this way, the digital beam forming may be carried out in a simple manner.

In order to determine the combined ego-velocity estimated value, an averaged velocity value of the individual ego-velocity estimated values may be calculated. In this case, a classical averaging such as, for example, an arithmetic average, a weighted averaging, for example, with weights that are a function of the signal-to-noise ratio, a determination of the maximum in the histogram, a formation of a median, etc., may be carried out.

In accordance with an example embodiment of the present invention, it is preferably provided to ascertain a respective angle estimated value and a respective velocity estimated value for the moving targets as well. Since, however, the velocity of the moving target is not known, the above-described evaluation would result in an erroneous angle estimated value. The angle estimated value, which resulted for precisely this moving target in the aforementioned angle estimation may be used as the angle estimated value for the particular moving target. This does not result in an improved angle estimation, but the erroneous angle estimation is avoided. For this purpose, the above-described multiple receiving and/or transmission channels are particularly advantageously used. Furthermore, a radial velocity estimated value for the respective moving target may be ascertained from the relative velocity measured with the aid of a Doppler shift. For this purpose, the combined ego-velocity estimated value ascertained above is assumed to be the ego-velocity of the radar and, weighted with the target angle, is subtracted from the relative velocity.

The movements of both the radar as well as the moving targets are assumed to be two-dimensional in a plane. However, the target measured by the sensor may be located at a different height relative to the plane. This may occur, in particular, if only one part of an object is detected, for example. In this case, an elevation angle between the plane and the target may be ascertained for the target. The elevation angle is preferably taken into consideration for each target when ascertaining the individual ego-velocity estimated value of the synthetic aperture radar sensor with the aid of the relative velocity and the estimated angle.

The radar sensor is preferably a chirp sequence radar, which functions as a frequency-modulated continuous wave radar and emits chirp signals with rapidly rising ramps. In this way, the distance may be easily measured in a known manner per se. In addition, the Doppler effect, in particular, the Doppler shift, may be determined from the temporal development of the phase of the complex distance signal across the ramps and in this way the relative velocity may be measured.

Conventional methods may be used for ascertaining the relative velocity with the aid of the Doppler effect. In this case, a Keystone processing (CZT) is preferred, since this is particularly computationally efficient and is able to compensate for occurring migration effects.

In accordance with an example embodiment of the present invention, the computer program is configured to carry out each step of the method, in particular, when it is executed on a computer or control unit of a radar sensor. It enables the implementation of the method in a conventional radar sensor. For this purpose, it is stored on a machine-readable memory medium.

In accordance with an example embodiment of the present invention, a synthetic aperture radar sensor is also provided, which includes a sensor array and is configured to determine an ego-velocity estimated value and an angle estimated value with the aid of the example method.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
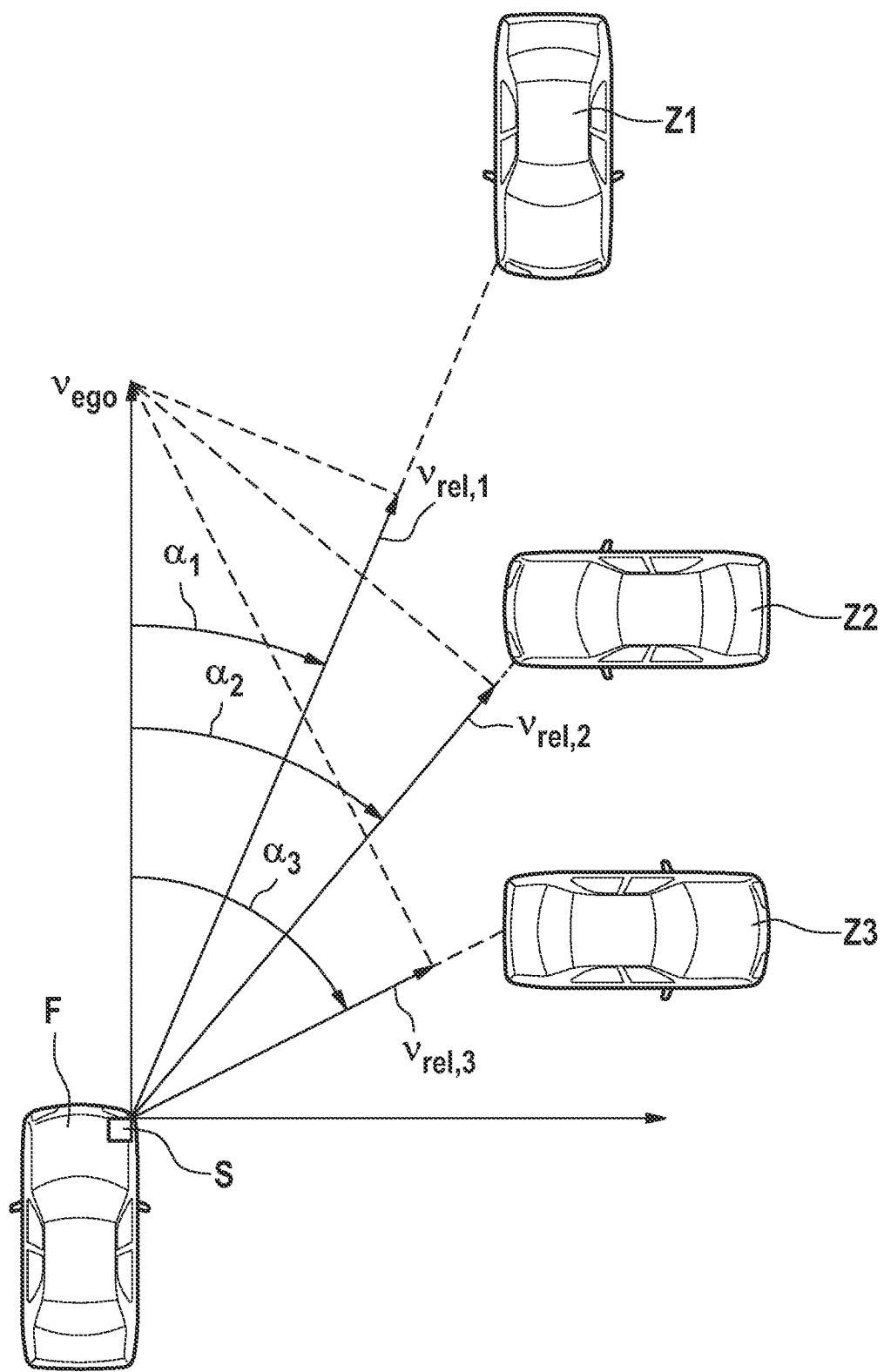
FIG. 1 schematically shows a representation of a traffic situation, in which various targets and associated angles and relative velocities are represented, and in which the synthetic aperture radar sensor according to the present invention is used.

FIG. 1 schematically shows a representation of a traffic situation, including a vehicle F, which includes a synthetic aperture radar sensor S according to the present invention, and multiple other vehicles, which are identified as targets Z1 through Z3. Further targets not represented here are typically present in the surroundings such as, for example, buildings, the infrastructure of the road, i.e., traffic signs, guard rail and the like, or the road itself. Vehicle F, and thus also radar sensor S, move at an ego-velocity $v_{ego}$ along a straight line. Starting from radar sensor S, azimuth angle $\alpha_1$, $\alpha_2$, $\alpha_3$ for each represented target Z1, Z2, Z3 is represented in each case between the direction of ego-velocity $v_{ego}$ and the direction of respective target Z1, Z2, Z3. In addition, relative velocity $v_{rel,1}$, $v_{rel,2}$, $v_{rel,3}$ of each target Z1, Z2, Z3 is represented relative to radar sensor S. If one of the targets, for example, target Z1, is a stationary target, i.e., it does not move, associated relative velocity $v_{rel,1}$ is given as a projection of ego-velocity $v_{ego}$ of radar sensor S at associated azimuth angle $\alpha_1$. The projections are shown in FIG. 1 for all three targets Z1, Z2, Z3. In the case of a moving target, for example, target Z2, which moves at an unknown velocity, the velocity of target Z2 is part of relative velocity $v_{rel,2}$ and measured relative velocity $v_{rel,2}$ deviates from the projection.

Figure 2:
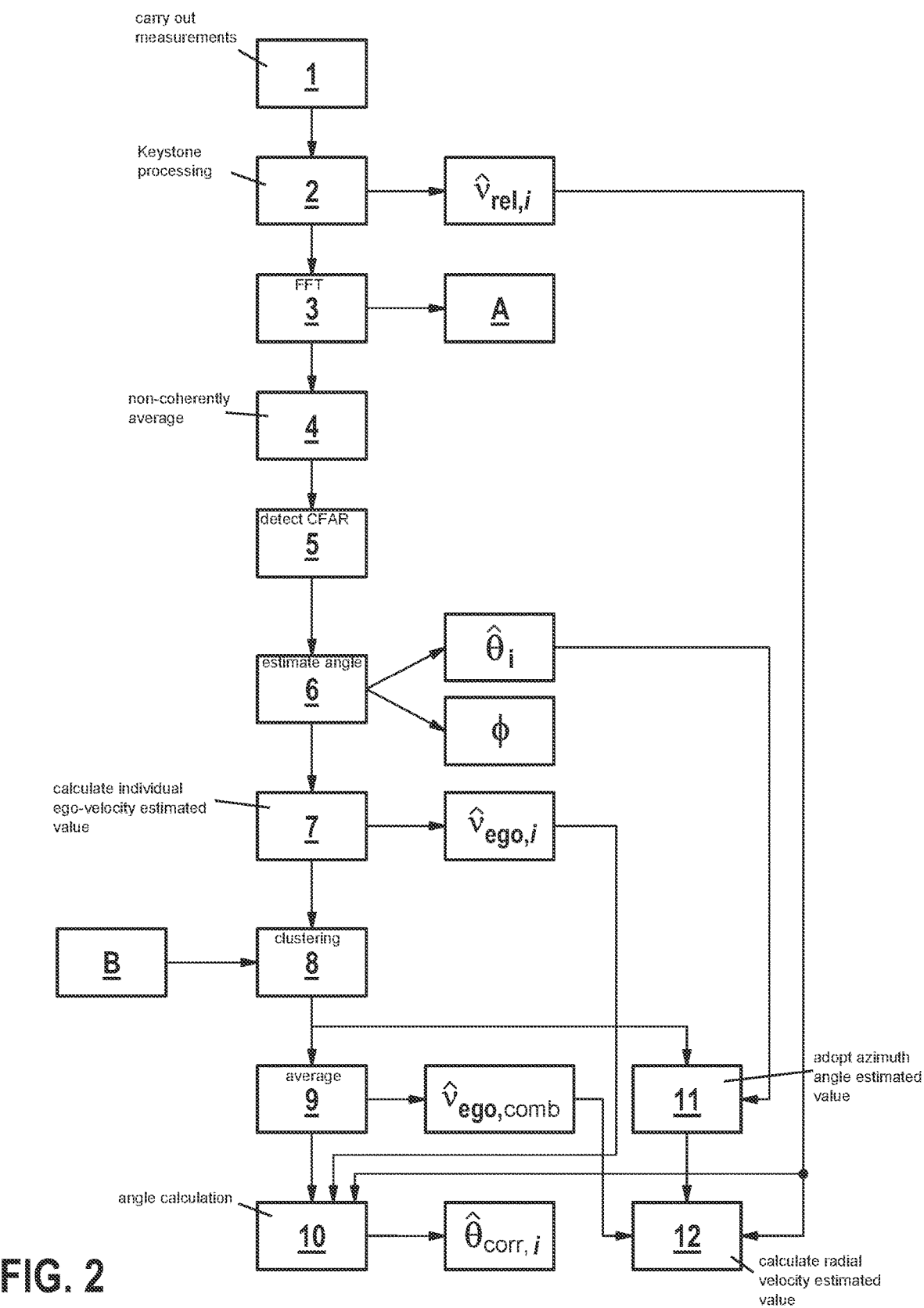
FIG. 2 shows a flowchart of one exemplary embodiment of the method according to the present invention.

FIG. 2 shows a flowchart of one exemplary embodiment of the method according to the present invention. In this method, a multitude of targets, identified here generally with i, are examined. Measurements 1 are carried out while vehicle F and radar sensor S are moving. Radar sensor S is designed as a sensor array and includes multiple transmission channels and, if necessary, multiple receiving channels. Measurements 1 are carried out using a frequency-modulated continuous wave radar modulation (FMCW), in which chirp signals having rapidly rising linear frequency ramps of the same slope are output at predefined temporal intervals. The reflected signals are received and processed as received signals. A mixture of the instantaneous transmit signal with the received signal results in a low-frequency beat signal, whose frequency is proportional to the distance of target i. Measurements 1 are carried out in such a way that the Doppler effect and the Doppler shift in the beat frequency are insignificant or are taken into consideration in the evaluation.

A Keystone processing 2 is subsequently carried out. In this case, an estimation of the Doppler shift or the Doppler frequency is carried out by determining the temporal development of the phase of the complex measured signals across the frequency ramps and by compensating for the corresponding linear distance change (migration) for each estimated value. In this way, relative velocities $v_{rel,i}$ are ascertained for each target i. A distance estimation from the time range into the frequency range subsequently takes place with the aid of a conventional Fourier processing 3, in particular, a Fast Fourier Transform (FFT). The generated two-dimensional spectra (distance and relative velocity) of the individual transceiver channel combinations are non-coherently averaged 4. For this purpose, the amount of each individual one of these spectra is formed and these amounts or their square values are then added together. A detection at a constant false alarm rate (CFAR) 5 is carried out in order to identify the targets in the measurements.

In addition, an angle estimation 6 is carried out, in which azimuth angle estimated values $\hat{\theta}_i$ for the targets are ascertained. Azimuth angle estimated value $\hat{\theta}_i$ represents the azimuth angle between a measuring axis of radar sensor S and target i, and thus also reflects the installation situation of radar sensor S. Since the installation situation is known, it is possible to convert azimuth angle estimated value $\hat{\theta}_i$ via coordinate transformation into an estimated value for azimuth angle $\alpha_i$ between the direction of ego-velocity $v_{ego}$ and the direction of target i. For the case shown in FIG. 1, the measuring axis is perpendicular to the direction of ego-velocity $v_{ego}$. This results in the following correlation: $\theta_i = 90 - \alpha_i$. Digital beam forming is used for angle estimation 6. In this case, measurements are carried out simultaneously over the multiple receiving and transmission channels at different positions on the sensor array and a phase difference is calculated, from which azimuth angle estimated values $\hat{\theta}_i$ may then be ascertained. The influence of ego-velocity $v_{ego}$ of radar sensor S for this type of angle estimation is insignificant, so that azimuth angle estimated values $\hat{\theta}_i$ are ascertained separately from ego-velocity $v_{ego}$ of radar sensor S. In angle estimation 6, an elevation angle $\phi_i$ between the plane in which the vehicle moves and the height at which target i is detected, is also ascertained.

Thus, relative velocity $\hat{v}_{rel,i}$, azimuth angle estimated value $\hat{\theta}_i$ and, optionally, elevation angle $\phi_i$ are known for each target i. Thus, an individual ego-velocity estimated value $\hat{v}_{ego,i}$ according to formula 1 is calculated 7 separately for each target i:

$$\hat{v}_{ego,i} = \frac{\hat{v}_{rel,i}}{\sin\hat{\theta}_i \cdot \cos\phi_i} \quad \text{(Formula 1)}$$

Figure 3A:
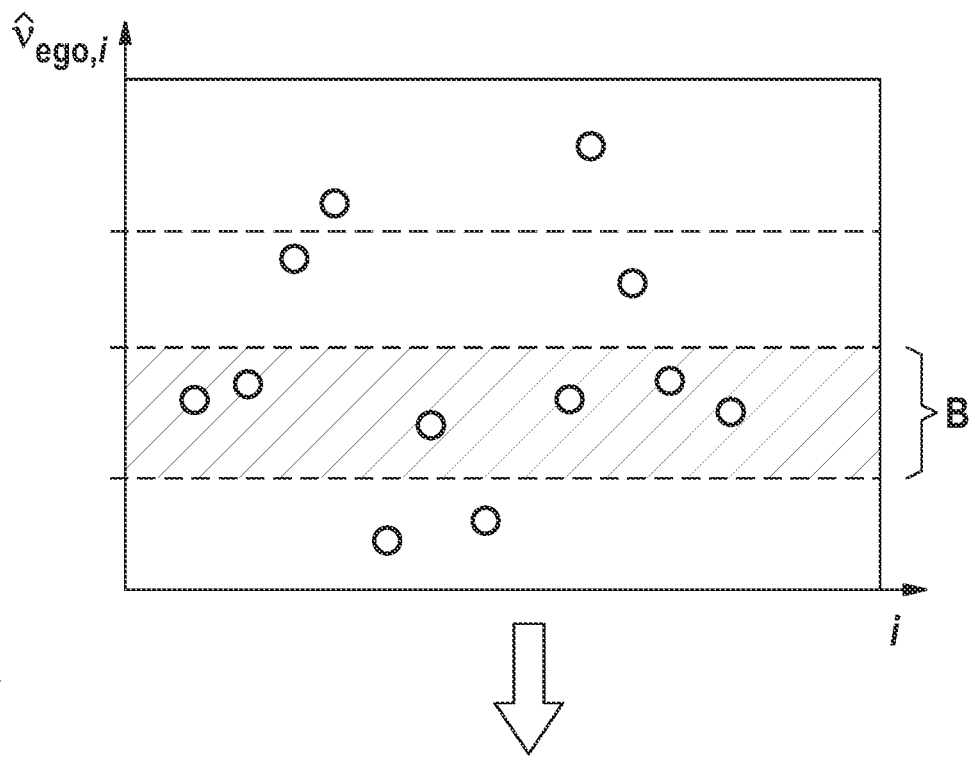
FIG. 3A shows a diagram of the distribution of individual ego-velocity estimated values of the radar sensor for different targets.
Figure 3B:
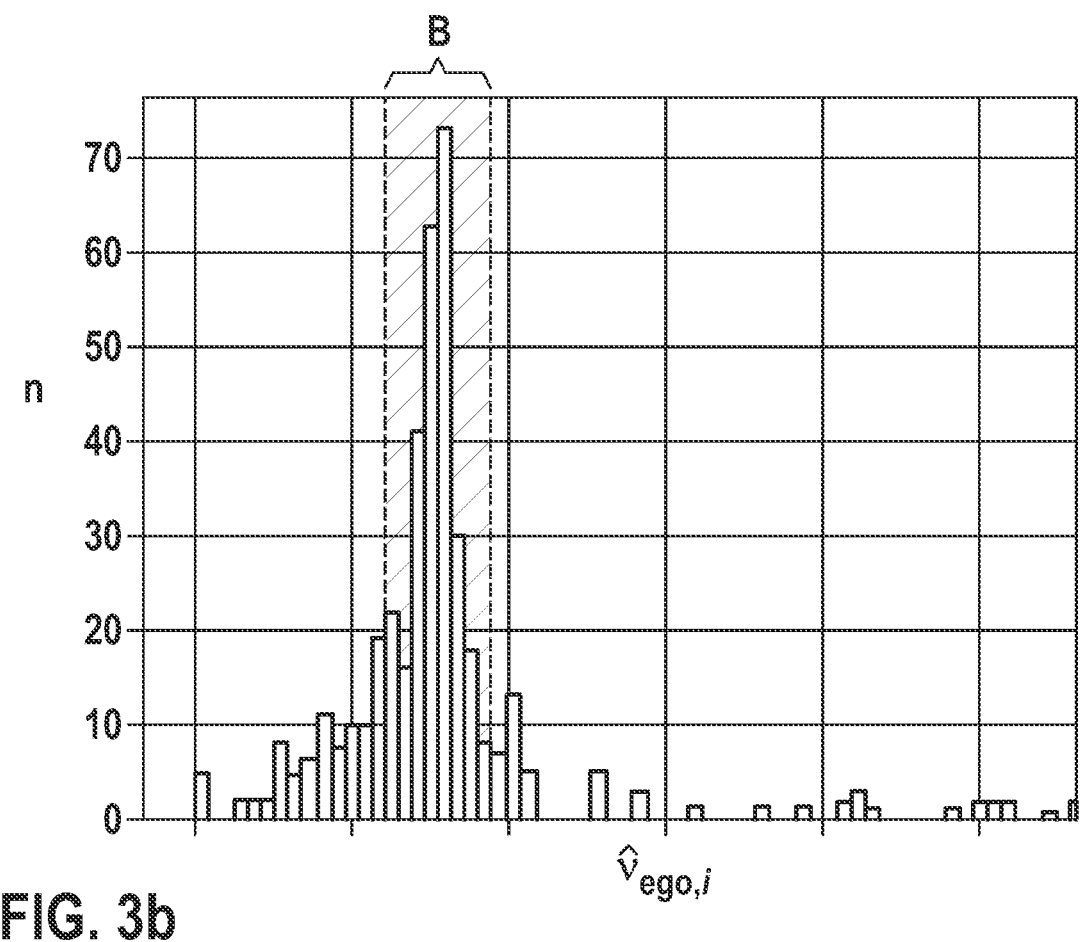
FIG. 3B shows a histogram for the distribution from FIG. 3A.

Individual ego-velocity estimated values $\hat{v}_{ego,i}$ calculated in this way for several targets i are shown in a diagram in FIG. 3a. FIG. 3b shows a histogram, in which the averaged number n ascertained for each of a multitude of different individual ego-velocity estimated values $\hat{v}_{ego,i}$ is plotted. In both figures, it is apparent that individual ego-velocity estimated values $\hat{v}_{ego,i}$ accumulate in a range B. In a typical traffic situation, significantly more stationary objects than moving objects having the same relative velocity radially to radar sensor S are present.

Referring to FIG. 2, a clustering 8 takes place, in which individual ego-velocity estimated values $\hat{v}_{ego,i}$ situated within range B, are assigned to stationary targets and individual ego-velocity estimated values $\hat{v}_{ego,i}$ situated outside range B are assigned to moving targets. The moving targets are thus identified (MTI—moving target indication) and separated from the stationary targets. Range B is defined via the errors in measurement 1 and in angle estimation 6 and represents an error tolerance range.

Individual ego-velocity estimated values $\hat{v}_{ego,i}$ assigned to the stationary targets, i.e., which are situated within range B are averaged 9, in order to obtain a combined ego-velocity estimated value $\hat{v}_{ego,k}$. Various types of averaging processes may be carried out, for example, a classical averaging such as, for example, an arithmetic average, a weighted averaging, for example, with weights as a function of the signal-to-noise ratio, a determination of the maximum in the histogram, a formation of a median, etc. Since the combined ego-velocity estimated value $\hat{v}_{ego,comb}$ has been calculated, in principle, without the moving targets, it may be regarded as actual ego-velocity $\hat{v}_{ego}$ of radar sensor S. In this way, an autofocus is achieved. For each stationary target, an angle calculation 10 also takes place from relative velocity $\hat{v}_{rel,i}$ for the stationary target ascertained by Keystone processing 2 with the aid of the Doppler effect and from calculated individual ego-velocity estimated value $\hat{v}_{ego,i}$ for the stationary target with the aid of formula 2:

$$\hat{\theta}_{corr,i} = \arcsin\left(\frac{\hat{v}_{rel,i}}{\hat{v}_{ego,i}}\right) \quad \text{(Formula 2)}$$

As a result, a corrected angle estimated value $\hat{\theta}_{corr,i}$ is calculated, which may be regarded as the actual azimuth angle of the target with respect to radar sensor S.

For the moving targets, however, above-described angle calculation 10 would result in an erroneous angle estimation, since the velocity component of the moving target is unknown and may therefore not be taken into consideration. For a moving target, therefore, azimuth angle estimated value $\hat{\theta}_i$ ascertained in angle estimation 6 is adopted 11. No improved angle estimation is achieved as a result, however, the erroneous angle estimation is avoided. Finally, a radial velocity estimated value of the moving target may be calculated 12 by subtracting the combined ego-velocity estimated value $\hat{v}_{ego,comb}$ ascertained for the stationary targets by averaging 9 from relative velocity $\hat{v}_{rel,i}$ ascertained by Keystone processing 2 with the aid of the Doppler shift.

Figure 4:
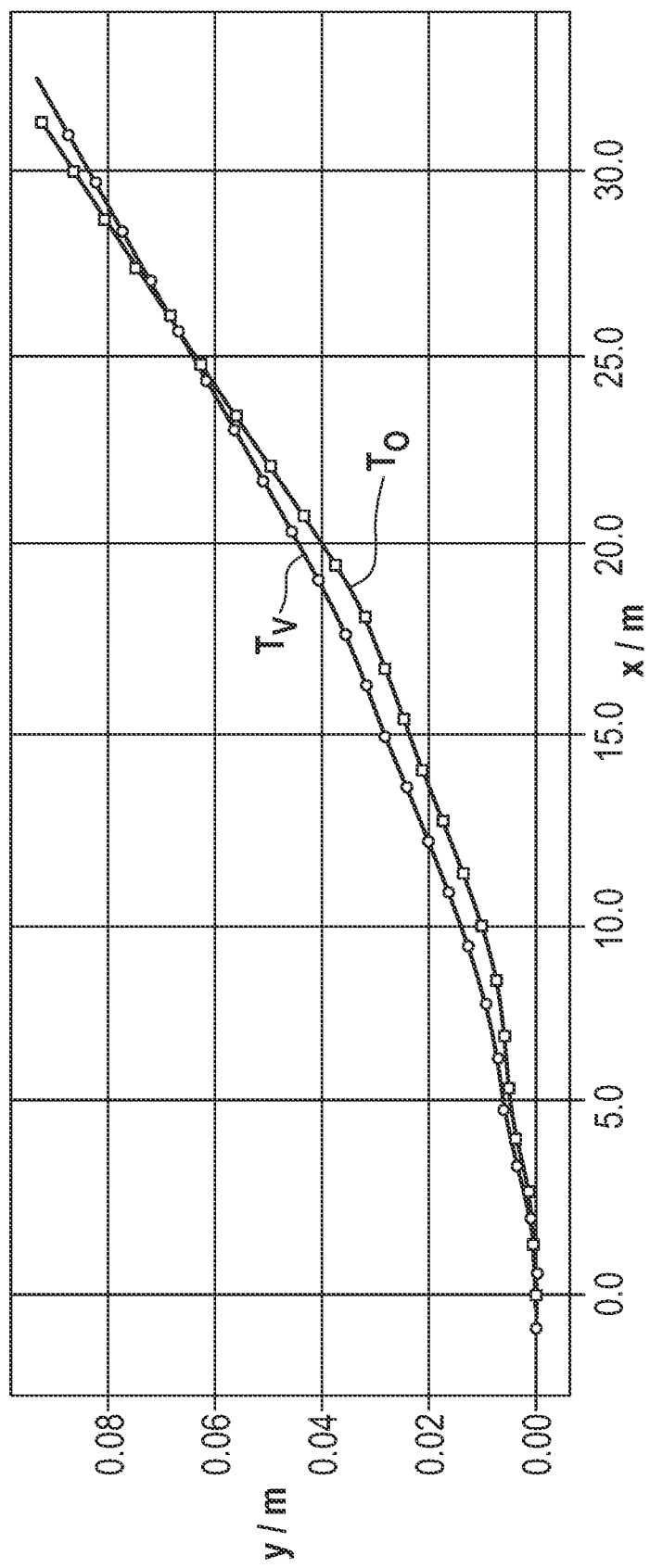
FIG. 4 shows a location diagram of a trajectory, which has been generated based on one specific embodiment of the method according to the present invention, and of a trajectory, which has been generated with the aid of an odometry sensor.

FIG. 4 shows a comparison between an odometry trajectory $T_o$, which has been ascertained in a conventional manner with the aid of an odometry sensor, and a trajectory $T_v$, which has been generated based on one specific embodiment of the method according to the present invention. It is apparent that the two trajectories very closely match one another, and thus the autofocus provides precise results with the aid of the method according to the present invention.

What is claimed is:

1. A method for determining an ego-velocity estimated value and an angle estimated value of targets using a synthetic aperture radar sensor, comprising the following steps:
   measuring, using the synthetic aperture radar sensor, a respective distance between the synthetic aperture radar sensor and each respective target;
   measuring, using the synthetic aperture radar sensor, a respective relative velocity of each respective target using the Doppler effect;
   performing an angle estimation of one respective angle estimated value for each respective target, which characterizes an angle between a direction of an ego-velocity of the synthetic aperture radar sensor and each respective target;
   ascertaining an individual ego-velocity estimated value of the synthetic aperture radar sensor using the respective relative velocity and the respective angle estimated value for each respective target;
   classifying and distributing the individual ego-velocity estimated values relating to stationary targets, whose individual ego-velocity estimated values are situated within a predefinable range relative to one another, and relating to moving targets, whose individual ego-velocity estimated values are situated outside the predefinable range;
   ascertaining a combined ego-velocity estimated value from the individual ego-velocity estimated values of the stationary targets; and
   ascertaining a corrected angle estimated value for the stationary targets using the combined ego-velocity estimated value and the respective measured relative velocity.

2. The method as recited in claim 1, wherein the predefinable range is an error tolerance range, which is ascertained from an error for the measurement of the relative velocity and from an error for the angle estimation.

3. The method as recited in claim 1, wherein the angle estimation for each respective target takes place using multiple receiving and/or transmission channels at different positions.

4. The method as recited in claim 1, wherein an averaged velocity value for the stationary targets is determined as the combined ego-velocity estimated value by weighted and or unweighted averaging.

5. The method as recited in claim 1, wherein for each moving target, the respective angle estimated value resulting from the angle estimation is adopted as the angle estimated value for the moving target.

6. The method as recited in claim 1, wherein a velocity estimated value for each moving target is ascertained from the respective relative velocity of the moving target, which is measured using the Doppler effect.

7. The method as recited in claim 1, wherein an elevation angle is taken into consideration when ascertaining the individual ego-velocity estimated value of the synthetic aperture radar sensor using the respective relative velocity and the respective angle estimated value for each respective target.

8. The method as recited in claim 1, wherein the radar sensor is a chirp sequence radar.

9. The method as recited in claim 1, wherein an ascertainment of each respective relative velocity takes place using the Doppler effect with the aid of a Keystone processing.

10. A non-transitory machine-readable memory medium on which is stored a computer program for determining an ego-velocity estimated value and an angle estimated value of targets using a synthetic aperture radar sensor, the computer program, when executed by a computer, causing the computer to perform the following steps:

measuring, using the synthetic aperture radar sensor, a respective distance between the synthetic aperture radar sensor and each respective target;

measuring, using the synthetic aperture radar sensor, a respective relative velocity of each respective target using the Doppler effect;

performing an angle estimation of one respective angle estimated value for each respective target, which characterizes an angle between a direction of an ego-velocity of the synthetic aperture radar sensor and each respective target;

ascertaining an individual ego-velocity estimated value of the synthetic aperture radar sensor using the respective relative velocity and the respective angle estimated value for each respective target;

classifying and distributing the individual ego-velocity estimated values relating to stationary targets, whose individual ego-velocity estimated values are situated within a predefinable range relative to one another, and relating to moving targets, whose individual ego-velocity estimated values are situated outside the predefinable range;

ascertaining a combined ego-velocity estimated value from the individual ego-velocity estimated values of the stationary targets; and ascertaining a corrected angle estimated value for the stationary targets using the combined ego-velocity estimated value and the respective measured relative velocity.

11. A synthetic aperture radar sensor, comprising:

a sensor array;

wherein the synthetic aperture radar sensor is configured to determine an ego-velocity estimated value and an angle estimated value of targets using the sensor array, the synthetic aperture radar sensor being configured to:

measure a respective distance between the synthetic aperture radar sensor and each respective target;

measure a respective relative velocity of each respective target using the Doppler effect;

perform an angle estimation of one respective angle estimated value for each respective target, which characterizes an angle between a direction of an ego-velocity of the synthetic aperture radar sensor and each respective target;

ascertain an individual ego-velocity estimated value of the synthetic aperture radar sensor using the respective relative velocity and the respective angle estimated value for each respective target;

classify and distribute the individual ego-velocity estimated values relating to stationary targets, whose individual ego-velocity estimated values are situated within a predefinable range relative to one another, and relating to moving targets, whose individual ego-velocity estimated values are situated outside the predefinable range;

ascertain a combined ego-velocity estimated value from the individual ego-velocity estimated values of the stationary targets; and ascertain a corrected angle estimated value for the stationary targets using the combined ego-velocity estimated value and the respective measured relative velocity.

\* \* \* \* \*